Dec. 26, 1967

E. KELLEY, JR 3,360,257

RECORD REPEATING DEVICE

Filed Oct. 12, 1965

*INVENTOR.*

EDGAR KELLEY, JR.

BY

*Warren, Brosler, Cypher and Anglim*

ATTORNEYS

United States Patent Office 3,360,257
Patented Dec. 26, 1967

3,360,257
RECORD REPEATING DEVICE
Edgar Kelley, Jr., 6623 Simson St.,
Oakland, Calif. 94605
Filed Oct. 12, 1965, Ser. No. 495,146
6 Claims. (Cl. 274—1)

The present invention relates to devices for use with record changers and more specifically to devices which may be attached to automatic record changers for causing continuous play of a particular record.

Present day record changers are constructed so that the pick-up arm automatically is returned to a 10 inch landing position. An indexing lever mounted adjacent the turn table and connected to the pick-up arm, when actuated by the dropping of a 12 inch record, causes the pick-up arm to land at a 12 inch landing position. This means of automatically returning the pick-up arm to 10 and 12 inch positions makes it possible to play 10 inch and 12 inch records intermixed.

Such automatic record changers automatically turn off the record player after the playing of the last record if the stabilizer arm is in its normal position for stabilizing a stack of records. If the stabilizer arm, however, is moved to a position for receiving records (normally swung to one side), the record player will not automatically shut off but will continue to repeat the last record on the changing table. Record changers, as above described, automatically return the pick-up arm to the 10 inch landing. This is desirable if one wishes to repeat a 10 inch record but unfortunately long playing records are standardized at 12 inches and automatic changers have the aggravating problem of starting the play of the record well past the beginning point.

There is a need for a device for causing automatic record changers to repeat 12 inch records where, for example, it is desired to repeat a sales record in stores, terminals, etc. The device is practically a necessity for teenagers who somehow can listen to the same record for hours and others will find the device a boon in repeating a "background type" record for setting the proper theme or musical atmosphere. Another use is for teaching small children, birds, animals and other major instances where teaching is by rote.

Accordingly an object of the present invention is to provide a device which may be removably attached to an automatic record changer and which will cause the player to reliably and accurately repeat 12 inch records over a long period of time.

Another object of the invention is to provide a device which may be inexpensively manufactured, is easy to attach and remove from automatic record players.

Still another object of the present invention is to provide a device which in its modified form is suitable for use on all standard automatic three-speed record changers.

A still further object is to provide a device which may be moved to a non-engaged but attached position on the record changer which will not interfere in any way with the normal operation and function of an automatic three-speed record changer.

The invention possesses other objects and features of advantage, some of which of the foregoing will be set forth in the following description of the preferred form of the invention which is illustrated in the drawing accompanying the forming part of this specification. It is to be understood, however, that variations in the showing made by the said drawing and description may be adopted within the scope of the invention as set forth in the claims.

Referring to the drawing (1 sheet):

Figure 1:
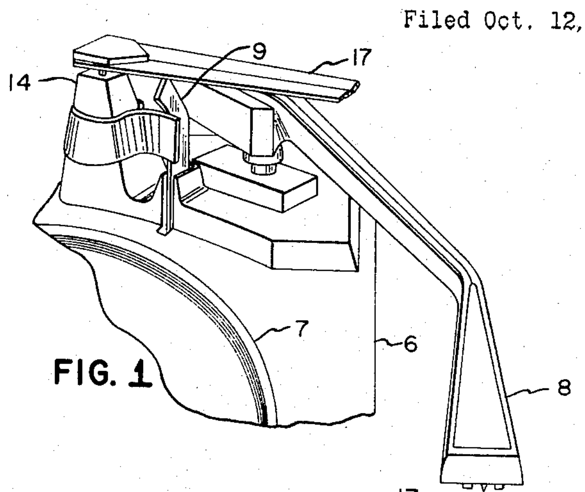
FIGURE 1 is a partial perspective view of an automatic record changer showing the device in place.

This repeating device is designed to be mounted upon the base or parts of existing record changers and does not require any special construction or modification of such record changers. One of such standard record changers is the RCA Victor which comes in Models RP-197-1, -6, B-1, R,198-1, -2. The RCA model and many other standard three-speed changers consist of a base 6, a turn table 7 mounted for rotation on the base for receiving records, means for storing the records above and for selectively dropping the records upon the table (not shown), a pick-up arm 8, an indexing lever 9 mounted for movement from a first position to an actuated second position by the dropping of the larger of the records to the table, means connecting the indexing lever and the pick-up arm (not shown) for selectively causing the arm to land at the beginning of the smaller record when the indexing lever is in the first position and at the beginning of the larger record when the indexing lever is actuated, and means for continuously repeating the cycle of movement of the tone arm from one end to the beginning of the records (not shown).

Figure 2:
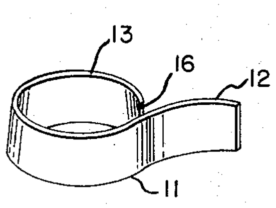
FIGURE 2 is an enlarged perspective view of the device shown in FIGURE 1.

The repeating device, in combination with the aforesaid record changer elements, consists briefly of a support 11, a foot 12 connected to the support and adapted for engaging and holding the indexing lever 9 in the second position, and means 13 carried by the support adapted for removable connection to the record changer.

Where the record changer includes an upright support 14 positioned adjacent the indexing lever, means 13 of the device may consist of an elongated resilient spring member having a first position as shown in FIGURE 1 adapted for surrounding and in frictional engagement with the support. If the operator does not wish to repeat a record, the device may be merely rotated on the support so that it does not engage the indexing lever. Where the support is tapered as shown in FIGURE 1, the device may be rotated to a new position by merely lifting slightly on the device and then rotating. A tapered support is not necessary where the device is made from a resilient spring material. The device shown in FIGURE 2 is made from a single piece of material with one end being looped upon itself leaving foot 12 protrude therefrom. End 16 may be sprung away from foot 12 so that the device may be clamped onto support 14.

Figure 3:
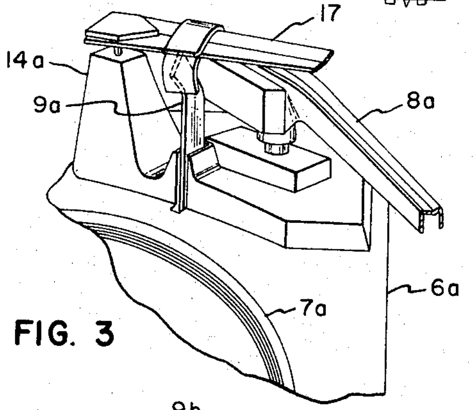
FIGURE 3 is a partial perspective view of an automatic record changer showing a modified form of the device in place.
Figure 4:
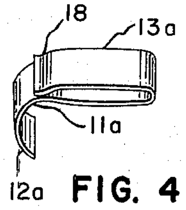
FIGURE 4 is an enlarged scale perspective view of the device shown in FIGURE 3.

A modified form of the device is shown in FIGURES 3 and 4 which attaches to the record stabilizer arm 17 instead of the stabilizer support. The device consists of a support 11*a*, a foot 12*a* and a means 13*a* adapted for removable connection to the record changer. In attaching the device to the stabilizer arm, means 13*a* is formed in an elongated loop to roughly conform to the contour of the stabilizer arm. By making the part from a resilient material such as plastic or spring metal, the device may be easily put onto and taken off of the stabilizer arm. Foot 12*a* is formed with a slight curve to firmly engage the indexing lever 9*a*. When it is desirable not to repeat a record, the device may be easily slid along the stabilizer arm 17 out of contact with the index lever. As may be seen in the drawing, means 13*a* is formed with a double curved end 18 to assist in the clamping action and to enable the operator to easily mount the device.

The modified form shown in FIGURE 3 attaches to a record changer identical to a changer shown in FIGURE 1 and consists of a base 6*a*, a turn table 7*a*, a pick-up arm 8*a*, an indexing lever 9*a*, and a support 14*a*.

Figure 5:
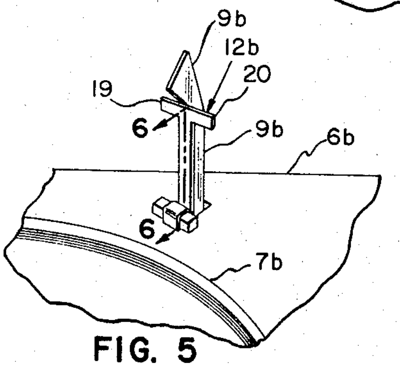
FIGURE 5 is a partial perspective view of a record changer showing another modified form of the device.
Figure 6:
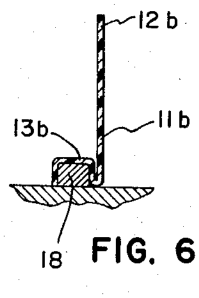
FIGURE 6 is a cross sectional view of the device shown in FIGURE 5 taken substantially along the lines 6—6 and shown on an enlarged scale.

Another modified form of the present invention is shown in FIGURE 5 and is useful with record changers having a metal base 6*b*, a turn table 7*b* mounted for rotation on the base, a pick-up arm pivotally mounted on the base (not shown), an indexing lever 9*b* operatively connected to the pick-up arm and having a first position causing the pick-up arm to land at the beginning of a small record and a second position causing said arm to land at the beginning of a larger size record. The modified form is useful with record players in which the indexing lever 9*b* is spaced from both the stabilizer arm and the stabilizer arm support. This modified form of the invention consists briefly of an elongated support 11*b*, a foot 12*b* connected to the support and adapted to releasably engage and hold the indexing lever in the second position to enable the changer to continuously and sequentially play a single large record, a magnet 18 adapted for releasable connection to the metal base 6*b* and means 13*b* for engaging the magnet. Several means may be utilized in grasping the magnet and as here shown the means consists of a channel shaped member into which a rectangular magnet is force-fit. The foot 12*b* is here shaped in the form of a T with laterally extending cross arms 19 and 20 to engage the indexing lever 9*b*.

Figure 7:
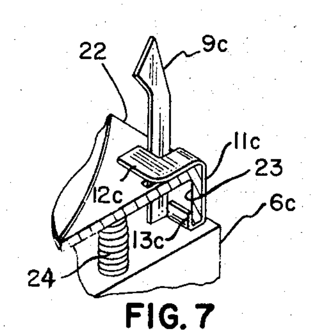
FIGURE 7 is a partial perspective view of a record changer showing still another modified form of the device.
Figure 8:
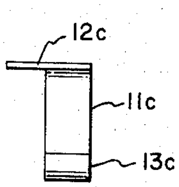
FIGURE 8 is a front elevation view of the device shown in FIGURE 7 on an enlarged scale.

Still another modified form of the present invention is shown in FIGURES 7 and 8 wherein the device is used in combination with a record changer having a sub-base 22 resiliently mounted upon and spaced from the base 6*c*, an indexing lever means 9*c* positioned adjacent a lip 23 and moveable from a first position causing the pick-up arm to land at the beginning of a 10 inch record to a second position causing the arm to land at the beginning of a 12 inch record. A spring 24 is one of several with which the sub-base 22 is mounted on the base 6*c*.

The modified form of the device which is adapted for mounting on the changer above-described is shown in FIGURE 8 and consists briefly of an elongated support 11*c*, an L-shaped foot 12*c* connected to the support and adapted to releasably engage and hold the indexing lever in the second position causing the changer to continuously and repeatedly play a single record, and means 13*c* carried by the support and formed for releasably engaging the lip of the sub-base. Means 13*c* is preferably made of spring steel to generally conform to the shape of the lip and here is shown as a J-shaped member.

In operation the device as shown in FIGURE 1 is mounted on the support 14 by spreading end 16 away from the foot 12 and permitting the end to snap back and frictionally engage the support so that foot 12 engages indexing lever 9. In order to make the standard record changer continue to play it is necessary to move the stabilizer arm 17 away from its normal stabilizing position and to the position shown in FIGURE 1. Foot 12 moves the indexing lever to its second position in which the pick-up arm is programmed to land on the beginning of a 12 inch record. In the position thus described, an automatic record player will continuously repeat the top record on the turn table 7 until the machine is manually turned off.

The bracket device shown in FIGURES 3 and 4 is clipped onto the stabilizer arm 17 so that the foot 12*a* moves the indexing lever to its normal second position so that the record player will continuously repeat the last record on the turntable until the machine is turned off. The bracket may be easily slid out of engagement with the indexing lever or may be removed entirely.

The device shown in FIGURE 5 employing a magnet operates the device by merely being placed against the indexing lever 9*b* so that it is moved to its second position which signals the pick-up arm to land on the beginning of a 12 inch record.

The device shown in FIGURE 7 which is connected to a resiliently mounted sub-base is operated by merely clipping it over the lip of the sub-base to engage the indexing lever in its second position to play 12 inch records.

I claim:

1. A device for an automatic record changer designed to play, in automatic sequence, a stack of intermixed larger and smaller records and having a base, a turn table mounted for rotation on said base for receiving said records, means for storing said records above and for selectively dropping said records upon said table, a pick-up arm, an indexing lever mounted for movement from a first position to an actuated second position by the dropping of the larger of said records to said table, said indexing lever having an exposed part extending above said base, means connecting said indexing lever and said pick-up arm for selectively causing said arm to land at the beginning of the smaller record when said indexing lever is in first position and at the beginning of the larger record when said indexing lever is actuated, and means for continuously repeating the cycle of movement of said tone arm from the end to the beginning of said records, the improvement comprising:

a support;

a foot connected to said support for engaging the exposed part of said indexing lever and thereby holding said indexing lever in said second position; and means carried by said support for removably connecting said support to said record changer.

2. A device for an automatic record changer designed to play, in automatic sequence, a stack of intermixed larger and smaller records and having a base, a turn table mounted for rotation on said base for receiving said records, means for storing said records above and for selectively dropping said records upon said table, a pick-up arm, an indexing lever mounted for movement from a first position to an actuated second position by the dropping of the larger of said records to said table, said indexing lever having an exposed part extending above said base, means connecting said indexing lever and said pick-up arm for selectively causing said arm to land at the beginning of the smaller record when said indexing lever is in first position and at the beginning of the larger record when said indexing lever is actuated, and means for continuously repeating the cycle of movement of said tone arm from the end to the beginning of said records, the improvement comprising: a bracket device having one end formed for engagement with the exposed part of said lever and an opposite end formed for detachable mounting on said record player, and being formed and dimensioned to displace said lever and hold said lever in said second position.

3. A device for an automatic record changer as characterized in claim 1 wherein said changer includes an elongated upright support positioned adjacent the exposed part of said indexing lever and said means of said improvement consists of an elongated resilient spring member having a first position adapted for surrounding and frictional engagement with said upright support and movable to a second position to release said member from said support.

4. A device for an automatic record changer as characterized in claim 1 wherein said changer includes a record stabilizer arm pivotally mounted on said base and movable to a position above the exposed part of said indexing lever and said means of said improvement consists of an open ended spring clip adapted for removable surrounding frictional connection to said stabilizer arm.

5. A device for an automatic record changer designed to play records of at least two different sizes in a continuous sequential cycle and having a metal base, a turn table mounted for rotation on said base, a pick-up arm pivotally mounted on said base, indexing means operatively connected to said pick-up arm and having an indexing lever with a first position causing said pick-up arm to land at the beginning of said smaller record and a second position causing said arm to land at the beginning of said larger size record said indexing lever having an exposed part extending above said base, the improvement comprising:

an elongated support;

a foot connected to said support to releasably engage the exposed part of said indexing lever and thereby hold said indexing lever in said second position to enable said changer to continuously and sequentially play a single large record;

a magnet adapted for releasable magnetic connection to said metal base; and means carried by said support for engaging said magnet.

6. A device for an automatic record changer designed to play records of at least two different sizes in a continuous sequential cycle and having a base, a sub-base resiliently mounted on and spaced from said base and having a lip formed thereon, a pick-up arm pivotally mounted on said sub-base, indexing means mounted on said base and being operatively connected to said pick-up arm and having an indexing lever positioned adjacent said lip movable from a first position causing said pick-up arm to land at the beginning of the smaller of said records to a second position causing said arm to land at the beginning of said larger size record said indexing lever having an exposed part extending above said base, the improvement comprising:

an elongated support;

an L-shaped foot connected to said support for releasably engaging and holding the exposed part of said indexing lever in said second position causing said changer to continuously and repeatedly play a single large record; and means carried by said support formed for releasably engaging said lip of said sub-base.

References Cited

UNITED STATES PATENTS 3,321,205 5/1967 Dennis -------------- 274—10

LEONARD FORMAN, *Primary Examiner.*

LLOYD V. ANDERSON, *Assistant Examiner.*